United States Patent
Tamura et al.

(10) Patent No.: US 6,990,724 B2
(45) Date of Patent: Jan. 31, 2006

(54) DYNAMOELECTRIC MACHINE WINDING JOINING METHOD

(75) Inventors: Syuuichi Tamura, Tokyo (JP); Hiroyuki Akita, Tokyo (JP); Takushi Takizawa, Tokyo (JP); Atsushi Oohashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 174 days.

(21) Appl. No.: 10/267,775

(22) Filed: Oct. 10, 2002

(65) Prior Publication Data
US 2003/0137207 A1    Jul. 24, 2003

(30) Foreign Application Priority Data
Jan. 21, 2002    (JP)    ............................ 2002-011486

(51) Int. Cl.
H02K 15/00    (2006.01)
H02K 15/14    (2006.01)
H02K 15/16    (2006.01)

(52) U.S. Cl. ........................... 29/596; 29/332; 29/598; 29/605; 29/732; 219/75; 219/125.11; 310/184

(58) Field of Classification Search ................. 29/596, 29/598, 332, 605, 732; 310/184; 219/75, 219/125.11
See application file for complete search history.

(56) References Cited

U.S. PATENT DOCUMENTS

| | | | |
|---|---|---|---|
| 6,403,921 B1 * | 6/2002 | Maeda et al. | .......... 219/125.11 |
| 6,490,779 B1 * | 12/2002 | Tokizawa et al. | .............. 29/596 |
| 6,501,206 B2 * | 12/2002 | Oohashi et al. | ............. 310/184 |

FOREIGN PATENT DOCUMENTS

| | | |
|---|---|---|
| EP | 1 041 696 A | 10/2000 |
| EP | 1 043 828 A | 11/2000 |
| JP | 58-221675 | 12/1983 |
| JP | 2000-350421 | 12/2000 |

* cited by examiner

Primary Examiner—A. Dexter Tugbang
Assistant Examiner—Tim Phan
(74) Attorney, Agent, or Firm—Sughrue Mion, PLLC

(57) ABSTRACT

An intermediate holding member is inserted between a second free end and a third free end from an inner circumferential side in a radial direction, a first radial restraining member presses against a free end at an innermost circumference from radially inside, and a second radial restraining member presses against a free end at an outermost circumference from radially outside. Next, a voltage is supplied between a torch and the members, an inert gas is supplied to the torch, and an arc discharge is generated between the torch and the free ends, welding the radially-adjacent free ends.

16 Claims, 9 Drawing Sheets

DYNAMOELECTRIC MACHINE WINDING JOINING METHOD

BACKGROUND OF THE INVENTION

1. Field of the Invention

The present invention relates to a dynamoelectric machine winding joining method, and particularly relates to a winding joining method applied to joining a stator winding for an alternator mounted to an automotive vehicle such as a passenger car or a truck.

2. Description of the Related Art

Conventionally, in the joining of dynamoelectric machine stator windings, a joining method is generally adopted in which an arc is discharged between an electrode and a winding joint portion and the heat thereof is used to fuse the winding together, as described in Japanese Patent Non-Examined Laid-Open No. 2000-350421, for example.

A conventional dynamoelectric machine winding joining method such as described in Japanese Patent Non-Examined Laid-Open No. 2000-350421, for example, will now be explained with reference to FIG. 19.

First, the construction of a stator to which this winding joining method is applied will be explained.

In this stator, U-shaped copper wires coated with an electrical insulator, for example, are inserted two by two into pairs of slots three slots apart such that return portions thereof are aligned at a first end surface of a stator core. In each of the pairs of slots, a first U-shaped copper wire is inserted into a first position and a second position from an inner circumferential side, and a second U-shaped copper wire is inserted into a third position and a fourth position from the inner circumferential side. In each of the slots, four copper wires are housed so as to line up in a single row in a radial direction.

At a second end surface of the stator core, free end sections of all of the U-shaped copper wires which are at an identical radial position are inclined in a like circumferential direction, and free end sections of radially-adjacent U-shaped copper wires are inclined in opposite circumferential directions. Then, the free ends 50 of each of the U-shaped copper wires are bent to face axially outward. In addition, the free ends 50 of the U-shaped copper wires projecting from the first position and the second position in each of the pairs of slots three slots apart are stacked in a radial direction, and the free ends of the U-shaped copper wires projecting from the third position and the fourth position in each of the pairs of slots three slots apart are stacked in a radial direction.

Thus, at the second end surface of the stator core, as shown in FIG. 19, the free ends 50 of the U-shaped copper wires form two pairs in a radial direction, and are arranged at a pitch of one slot in a circumferential direction. A clearance having a predetermined spacing is disposed between the two radially-adjacent pairs of free ends 50 for electrical insulation.

After the U-shaped copper wires constituting a stator winding are mounted to the stator core in this manner, an inner circumferential positive electrode 51 is disposed from the inner circumferential side of the stator core so as to contact the free ends 50 of the U-shaped copper wires positioned at an innermost circumference, an outer circumferential positive electrode 52 is disposed from an outer circumferential side of the stator core so as to contact the free ends 50 of the U-shaped copper wires positioned at the outermost circumference, and bar-shaped positive electrodes 53 are disposed so as to span between the inner and outer circumferential positive electrodes 51 and 52, the bar-shaped positive electrodes 53 being disposed between circumferentially-adjacent free ends 50 so as to contact circumferential side surfaces of each of the free ends 50.

Next, a torch 54 is moved above a pair of the free ends 50, a predetermined voltage is applied between the torch 54 and each of the electrodes 51, 52, and 53, and an inert gas, such as argon, helium, or the like, is supplied to the torch 54. Hence, an arc discharge 55 is generated between the torch 54 and the pair of free ends 50, fusing the pair of free ends 50 of the U-shaped copper wires together.

Each of the pairs of free ends 50 of the U-shaped copper wires are joined together sequentially by moving the torch 54 in a circumferential direction (or a radial direction). Thus, a stator winding is obtained which is composed of U-shaped copper wires linked into a desired pattern.

In the conventional dynamoelectric machine winding joining method, as explained above, the free ends 50 in each of the pairs are fused together by placing the inner and outer circumferential positive electrodes 51 and 52 on the innermost circumference and the outermost circumference of two pairs of free ends 50 arranged in single rows in a radial direction and inserting the bar-shaped positive electrodes 53 between the circumferentially-adjacent pairs of the free ends 50.

Thus, in the conventional winding joining method, if radial restraint of the free ends 50 on the innermost circumference by the inner circumferential positive electrode 51 is too small, the free ends 50 on the inner circumferential side are not placed in close contact with each other, making it necessary to melt the free ends 50 excessively. As a result, one problem has been that arc heat rises, giving rise to degradation of an electrically-insulating coating on the U-shaped copper wires, thereby making electrical insulation poor. In the worst cases, the free ends 50 on the inner circumferential side are too far apart from each other, and there has been a risk that they could not be joined together. If the radial restraint of the free ends 50 on the innermost circumference by the inner circumferential positive electrode 51 is too large, the free ends 50 are joined together with only a narrow radial clearance between the pairs of free ends 50. As a result, another problem has been that the joint portions may be short-circuited between the radially-adjacent pairs of free ends 50 by vibration or exposure to moisture, etc. Moreover, there are similar problems with the radial restraint of the free ends 50 on the outermost circumference by the outer circumferential positive electrode 52.

Because the radial clearance between the pairs of free ends 50 is very narrow compared to the clearance between circumferentially-adjacent the free ends 50 from the viewpoint of the construction of the stator core, it is extremely difficult to manage the radial restraint of the free ends 50 by the inner and outer circumferential positive electrodes 51 and 52, and in the worst cases, radially-adjacent pairs of the free ends 50 may be joined to each other erroneously. Thus, another problem has been that joining workability and yield have been poor.

SUMMARY OF THE INVENTION

The present invention aims to solve the above problems and an object of the present invention is to provide a dynamoelectric machine winding joining method enabling a winding to be joined simply and with a high yield by restraining radial movement of electrical conductor joint end portions at an innermost circumference and an outermost circumference by means of inner and outer circumferential positive electrodes, interposing an intermediate holding member between radially-adjacent pairs of the electrical conductor joint end portions, and joining together the electrical conductor joint end portions in each of the pairs to suppress degradation of an electrically-insulating coating on the electrical conductors and ensure clearance between the joint portions.

In order to achieve the above object, according to one aspect of the present invention, there is provided a dynamoelectric machine winding joining method for joining together radially-adjacent electrical conductor joint end portions two by two at an axial end portion of a cylindrical core, 2n of the electrical conductor joint end portions being arranged in a single row in a radial direction, where n is an integer equal to or greater than 2. The dynamoelectric machine winding joining method includes a joint end portion restraining process and a joining process for joining together the joint end portions being joined, the joining process being subsequent to the joint end portion restraining process. In the joint end portion restraining process, an intermediate holding member is interposed between pairs of the joint end portions being joined, a first radial restraining member is pressed against the joint end portion positioned at an innermost circumference from radially inside, and a second radial restraining member is pressed against the joint end portion positioned at an outermost circumference from radially outside. Whereby the joint end portions being joined are brought into close contact, the intermediate holding member and the joint end portions radially-adjacent to the intermediate holding member are brought into close contact, the first radial restraining member and the joint end portion positioned at the innermost circumference are brought into close contact, and the second radial restraining member and the joint end portion positioned at the outermost circumference are brought into close contact.

Therefore, the joint end portions being joined are brought into close contact while ensuring a clearance between the pairs of the joint end portions being joined, thereby it is not necessary to rigorously manage the pressure from the first and second radial restraining members, improving the joining operation. Further, radially-adjacent pairs of the joint end portions being joined are reliably prevented from being jointed to each other, improving field.

DETAILED DESCRIPTION OF THE PREFERRED EMBODIMENTS

Preferred embodiments of the present invention will now be explained with reference to the drawings.

Embodiment 1

Figure 1:
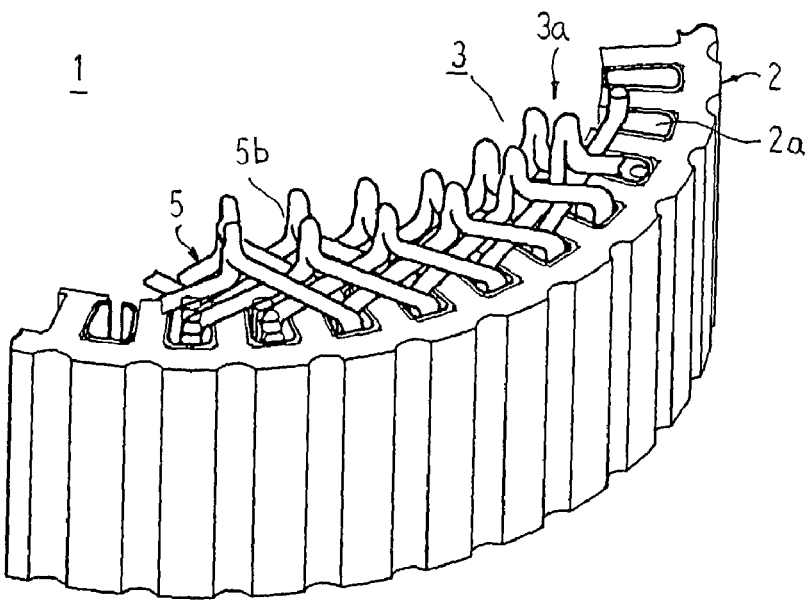
FIG. 1 is a perspective from a first end of a stator for an automotive alternator manufactured by a dynamoelectric machine winding joining method according to Embodiment 1 of the present invention.
Figure 2:
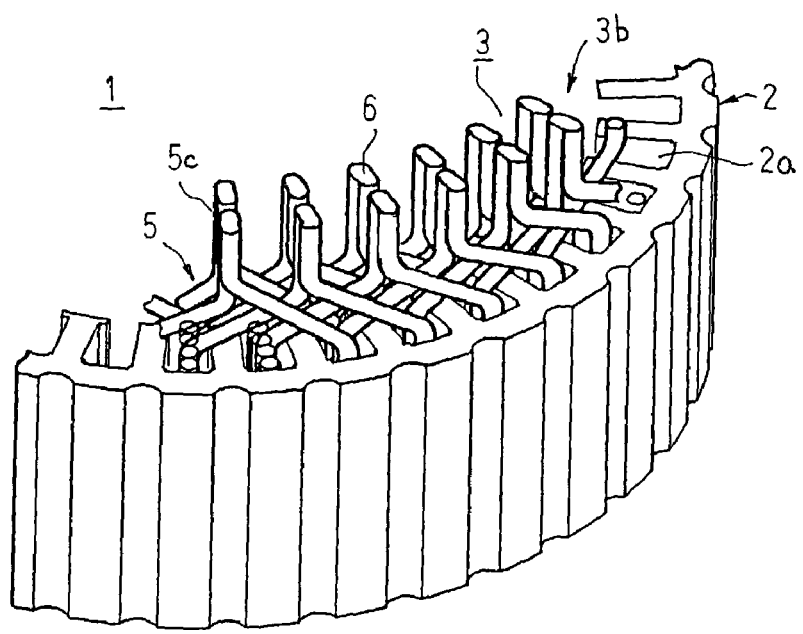
FIG. 2 is a perspective from a second end of the stator for an automotive alternator manufactured by the dynamoelectric machine winding joining method according to Embodiment 1 of the present invention.
Figure 3:
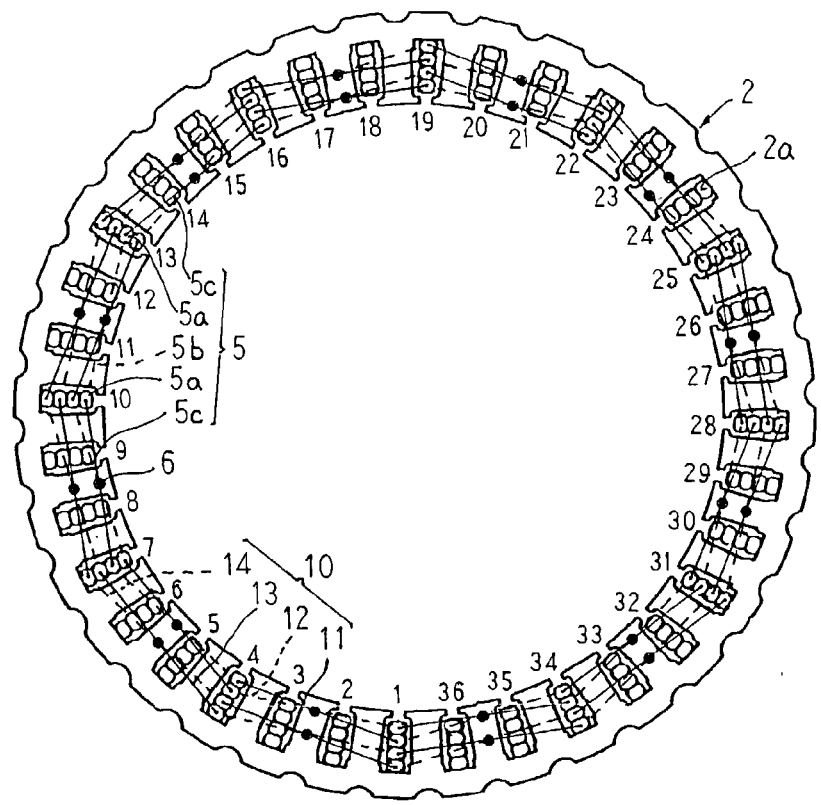
FIG. 3 is an end elevation explaining connections in a first stator winding phase portion of the stator shown in FIG. 1.
Figure 4:
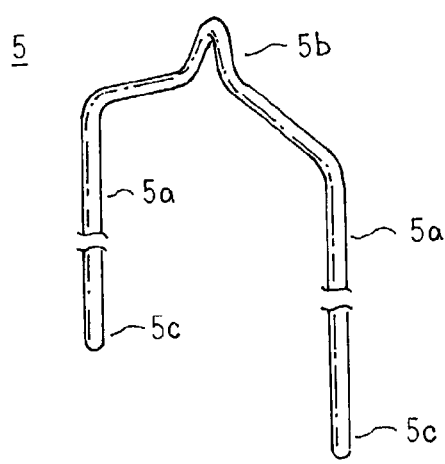
FIG. 4 is a perspective showing a conductor segment constituting a stator winding of the stator shown in FIG. 1.
Figure 5:
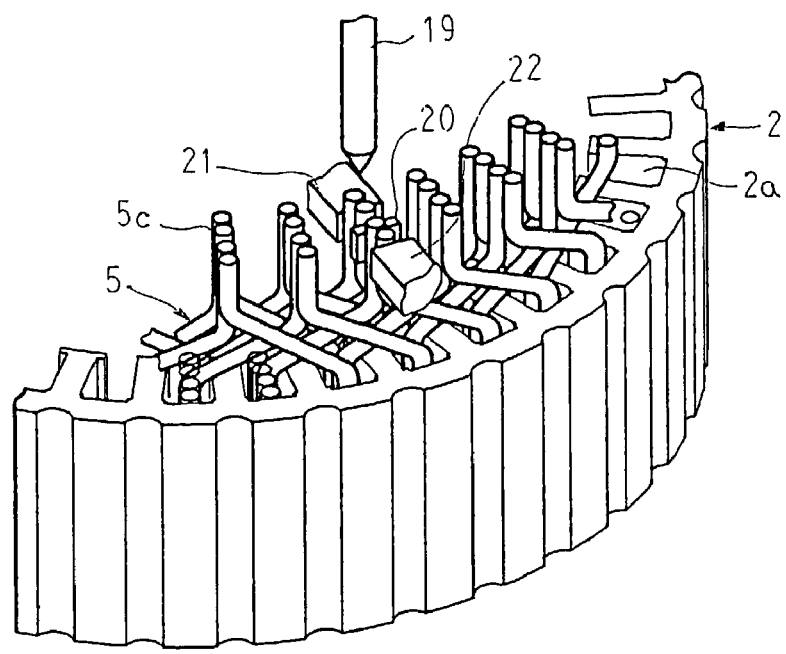
FIG. 5 is a perspective explaining the dynamoelectric machine winding joining method according to Embodiment 1 of the present invention.
Figure 6:
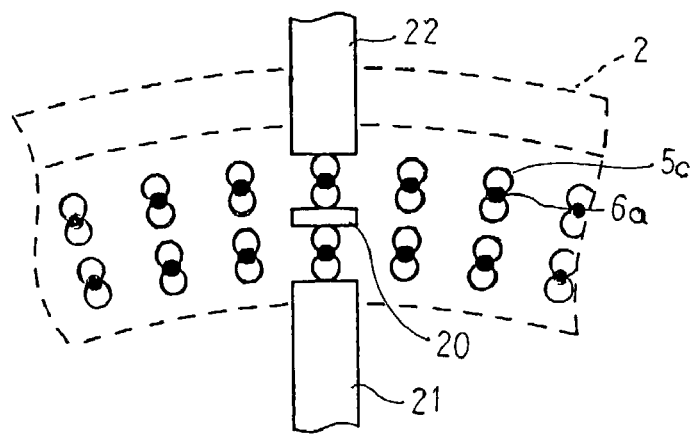
FIG. 6 is an end elevation explaining the dynamoelectric machine winding joining method according to Embodiment 1 of the present invention.

FIG. 1 is a perspective from a first end of a stator for an automotive alternator manufactured by a dynamoelectric machine winding joining method according to Embodiment 1 of the present invention, FIG. 2 is a perspective from a second end of the stator for an automotive alternator manufactured by the dynamoelectric machine winding joining method according to Embodiment 1 of the present invention, FIG. 3 is an end elevation explaining connections in a first stator winding phase portion of the stator shown in FIG. 1, FIG. 4 is a perspective showing a conductor segment constituting a stator winding of the stator shown in FIG. 1, and FIGS. 5 and 6 are a perspective and an end elevation, respectively, explaining the dynamoelectric machine winding joining method according to Embodiment 1 of the present invention.

Moreover, in FIG. 3, 1 through 36 represent slot numbers, broken lines indicate windings at a first end of the stator core, solid lines indicate windings at a second end of the stator core, and black dots indicate joint portions. Furthermore, output wires, a neutral-point lead wire, and crossover connections have been omitted from FIG. 3.

In FIGS. 1 and 2, a stator 1 is mounted to an automotive alternator functioning as a dynamoelectric machine, and includes: a cylindrical stator core 2 in which a plurality of slots 2a extending in an axial direction are formed at a predetermined pitch in a circumferential direction; and a stator winding 3 installed in the stator core 2. This stator winding 3 is constructed by inserting conductor segments 5 (electrical conductors) formed with a general U shape two by two from a first end surface of the stator core 2 into pairs of slots 2a three slots apart (a pitch of one magnetic pole) and joining together free ends (joint end portions) 5c thereof. Here, as shown in FIG. 4, the conductor segments 5 are formed with a general U shape in which a pair of straight portions 5a are linked by a generally V-shaped return portion 5b by bending a copper wire having a circular cross section coated with an electrical insulator.

At a first end surface of the stator core 2, pairs of generally V-shaped portions (coil ends) constituted by the return portions 5b of the conductor segments 5 are arranged at a pitch of one slot in a circumferential direction so as to be aligned and separated from each other in a radial direction, constituting a first coil end group 3a. In the first coil end group 3a, apex portions of the pairs of return portions 5b are arranged at a pitch of one slot in a circumferential direction so as to line up in single rows in a radial direction.

At a second end surface of the stator core 2, pairs of generally V-shaped portions (coil ends) in which portions of the conductor segments 5 projecting from pairs of slots 2a three slots apart are linked are arranged at a pitch of one slot in a circumferential direction so as to be aligned and separated from each other in a radial direction, constituting a second coil end group 3b. In the second coil end group 3b, pairs of joint portions 6 are arranged at a pitch of one slot in a circumferential direction so as to line up in single rows in a radial direction.

Next, the construction of an a-phase winding phase portion 10 constituting the stator winding 3 will be explained in detail with reference to FIG. 3.

In a slot group including Slot Numbers 1, 4, 7, etc., through 34, the conductor segments 5 are inserted two by two from the first end surface of the stator core 2 into pairs of slots 2a three slots apart (a slot pair including Slot Number 1 and Slot Number 4, a slot pair including Slot Number 4 and Slot Number 7, etc., for example) Here, in each of the pairs of slots, a first conductor segment 5 is inserted into a first position from an inner circumferential side (hereinafter called "Address 1") of a first slot 2a and a second position from the inner circumferential side (hereinafter called "Address 2") of a second slot 2a, and a second conductor segment 5 is inserted into a third position from the inner circumferential side (hereinafter called "Address 3") of the first slot 2a and a fourth position from the inner circumferential side (hereinafter called "Address 4") of the second slot 2a.

Then, free end sections of each of the conductor segments 5 projecting from each of the slots 2a at the second end surface of the stator core 2 are bent circumferentially into a splayed shape. In other words, the free end sections of all of the conductor segments 5 which are at an identical radial position are inclined in a like circumferential direction, and the free sections of radially-adjacent conductor segments 5 are inclined in opposite circumferential directions. In addition, the free ends 5c of each of the conductor segments 5 are bent to face axially outward.

Then, the free ends 5c of the conductor segments 5 projecting from Address 1 and Address 2 in each of the pairs of slots 2a three slots apart are stacked in a radial direction and joined, constituting single-turn first and second winding sub-portions 11 and 12 each composed of six conductor segments 5 connected in series. Similarly, the free ends 5c of the conductor segments 5 projecting from Address 3 and Address 4 in each of the pairs of slots 2a three slots apart are stacked in a radial direction and joined, constituting single-turn third and fourth winding sub-portions 13 and 14 each composed of six conductor segments 5 connected in series.

The 4-turn a-phase winding phase portion 10 is constructed by connecting the first to fourth winding sub-portions 11 to 14 constructed in this manner in series.

Although not shown, in a slot group including Slot Numbers 2, 5, 8, etc., through 35, four winding sub-portions each having one turn are constructed by inserting the conductor segments 5 two by two into pairs of slots 2a three slots apart and similarly joining together the free ends 5c. A 4-turn b-phase winding phase portion is constructed by connecting these four winding sub-portions in series. In addition, although not shown, in a slot group including Slot Numbers 3, 6, 9, etc., through 36, four winding sub-portions each having one turn are constructed by inserting the conductor segments 5 two by two into pairs of slots 2a three slots apart and similarly joining together the free ends 5c. A 4-turn c-phase winding phase portion is constructed by connecting these four winding sub-portions in series.

The stator winding 3 is constructed by forming the a-phase, b-phase, and c-phase winding phase portions constructed in this manner into an alternating-current connection.

Next, the joining of the free ends 5c of the conductor segments 5 will be explained with reference to FIGS. 5 and 6.

First, in each of the pairs of slots three slots apart, the first conductor segment 5 is inserted from the first end surface of the stator core 2 into Address 1 of the first slot 2a and Address 2 of the second slot 2a, and the second conductor segment 5 is inserted from the first end surface of the stator core 2 into Address 3 of the first slot 2a and Address 4 of the second slot 2a. Then, the free end sections of all of the conductor segments 5 which are at an identical radial position are inclined in a like circumferential direction, and the free end sections of radially-adjacent conductor segments 5 are inclined in opposite circumferential directions. In addition, the free ends 5c of each of the conductor segments 5 are bent to face axially outward. Next, the free ends 5c of the conductor segments 5 projecting from Address 1 and Address 2 in each of the pairs of slots are stacked in a radial direction, and the free ends 5c of the conductor segments 5 projecting from Address 3 and Address 4 in each of the pairs of slots are stacked in a radial direction. Thus, at the second end surface of the stator core 2, thirty-six rows of four free ends 5c are arranged into an annular shape at a pitch of one slot in a circumferential direction so as to line up in single rows in a radial direction.

Then, a flat intermediate holding member 20 made of a stainless steel is inserted between a second free end 5c and a third free end 5c of four free ends 5c arranged in a single row in a radial direction. In addition, a flat first radial restraining member 21 made of a stainless steel is pressed against the free end 5c at the innermost circumference from radially inside, and a flat second radial restraining member 22 made of a stainless steel is pressed against the free end 5c at the outermost circumference from radially outside.

Thus, as shown in FIGS. 5 and 6, first and second free ends 5c from the inner circumferential side in a radial direction are placed in close contact with each other, and third and fourth free ends 5c are also placed in close contact with each other. Furthermore, the second and third free ends 5c from the inner circumferential side in a radial direction are separated from each other by the intermediate holding member 20. In addition, the first and second radial restraining members 21 and 22 and the intermediate holding member 20 are placed in close contact with radially-adjacent free ends 5c.

Then, a torch 19 made of tungsten connected to a negative electrode of a welding power source (not shown) is moved above the pair of adjacent free ends 5c on the inner circumferential side. The first and second radial restraining members 21 and 22 and the intermediate holding member 20 are connected to a positive electrode of the welding power source. Then, when the welding power source is switched on, an inert gas, such as argon, helium, or the like, is supplied to the torch 19, and an arc is discharged between the torch 19 and a weld portion 6a (the pair of adjacent free ends 5c). The adjacent free ends 5c on the inner circumferential side are fused together by the heat of the arc.

Next, the torch 19 is moved above the pair of adjacent free ends 5c on the outer circumferential side and the adjacent free ends 5c on the outer circumferential side are fused together.

Next, the welding power source is switched off and the first and second radial restraining members 21 and 22 and the intermediate holding member 20 are similarly set on a circumferentially-adjacent row of free ends 5c. Then, the torch 19 is moved circumferentially by a pitch of one slot, and the adjacent free ends 5c are fused together in a similar manner.

This operation is repeated, sequentially fusing together pairs of adjacent free ends 5c.

Figure 7:
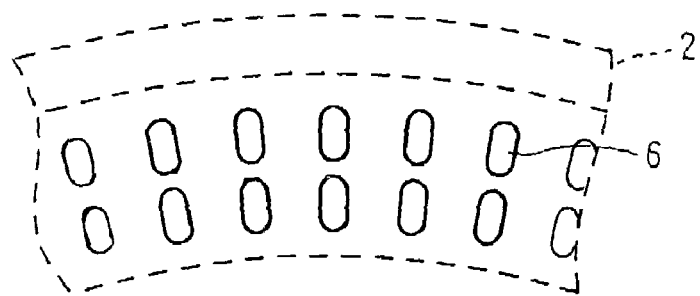
FIG. 7 is an end elevation schematically showing stator winding joint portions joined by the dynamoelectric machine winding joining method according to Embodiment 1 of the present invention.

After joining together all of the pairs of free ends 5c, the joining operation is completed by detaching the intermediate holding member 20 and the first and second radial restraining members 21 and 22. Thus, at the second end surface of the stator core 2, as shown in FIG. 7, thirty-six rows of two joint portions 6 are arranged into an annular shape at a pitch of one slot in a circumferential direction so as to line up in single rows with a clearance from each other in a radial direction.

Moreover, an electrically-insulating coating on the free ends 5c is removed using a cutter, or a chemical, etc., before or after insertion of the conductor segments 5 into the slots 2a.

Hence, according to Embodiment 1, because the intermediate holding member 20 is interposed between the pair of adjacent free ends 5c on the inner circumferential side and the pair of adjacent free ends 5c on the outer circumferential side, the free ends 5c forming the pairs can be brought into close contact by pressing from radially inside and outside by means of the first and second radial restraining members 21 and 22 while ensuring a clearance between the pairs of free ends 5c.

Thus, it is not necessary to rigorously manage the pressure from (restraint by) the first and second radial restraining members 21 and 22, improving the joining operation. Furthermore, the radially-adjacent pairs of free ends 5c are reliably prevented from being joined to each other erroneously, improving yield. Furthermore, because the free ends 5c are placed in close contact with each other, the free ends 5c can be joined together without raising the voltage applied between the torch 19 and the weld portion 6a of the free ends 5c excessively, enabling degradation of the electrically-insulating coating on the conductor segments 5 resulting from increases in arc heat to be suppressed. In addition, because the second and third free ends 5c from the inner circumferential side are joined to the first and fourth free ends 5c from the inner circumferential side, respectively, with each bent away from each other by the intermediate holding member 20, the clearance between the joint portions 6 is ensured even after the intermediate holding member 20 is removed, enabling short-circuiting among the joint portions 6 resulting from vibration or exposure to moisture, etc., to also be prevented, thereby improving electrical insulation.

Furthermore, in Embodiment 1, because the intermediate holding member 20 and the first and second radial restraining members 21 and 22 are made of a stainless steel, the arc heat is dissipated by means of the intermediate holding member 20 and the first and second radial restraining members 21 and 22, enabling degradation of the electrically-insulating coating on the conductor segments 5 due to arc heat to be suppressed. Because the heat applied to the weld portions 6a is conducted to the radially-adjacent weld portions 6a, the joined joint portions 6 are annealed, suppressing cracking of the joint portions 6 and the occurrence of blowholes due to contraction.

Because TIG welding (inert gas shielded tungsten arc welding) in which an inert gas, such as argon, helium, or the like, is supplied during welding is performed using a torch 19 made of tungsten, brazing materials for joining are unnecessary, ensuring insulation distance between the joint portions 6 without changing the molten volume of the weld portions 6a, thereby improving electrical insulation.

Moreover, in Embodiment 1 above, the free ends 5c are TIG welded, but the welding means is not limited to TIG welding provided that it is arc welding, and for example, $CO_2$ gas shielded arc welding, or MIG welding (Inert gas shielded metal arc welding), etc., may also be used.

Furthermore, in Embodiment 1 above, the intermediate holding member 20 and the first and second radial restraining members 21 and 22 are made of a stainless steel, but the members 20, 21, and 22 need only be made of a metal because they function as a positive electrode during TIG welding. If consideration is given to the fact that the members 20, 21, and 22 also have a function of dissipating arc heat, it is desirable that they be made of a metal having superior thermal conductivity, such as copper, for example.

Furthermore, in Embodiment 1 above, free-end-pressing surfaces of the first and second radial restraining members 21 and 22 are formed into flat surfaces, but a recess portion having an inner shape coming into surface contact with the free ends 5c may be provided on the free-end-pressing surfaces of the first and second radial restraining members 21 and 22. In that case, constraint of the free ends 5c by the first and second radial restraining members 21 and 22 is more reliable, improving the joining operation.

Embodiment 2

In Embodiment 2, the free ends 5c are joined together by soldering instead of TIG welding. Moreover, the rest of this embodiment is constructed in a similar manner to Embodiment 1 above.

Thus, similar effects to those in Embodiment 1 above can also be achieved in Embodiment 2.

Furthermore, in Embodiment 2, because the free ends 5c are joined together by soldering, the joint portions become a spherically-bulging shape. However, because the clearance between the pairs of free ends 5c is ensured, short-circuiting among the joint portions is suppressed.

Embodiment 3

Figure 8:
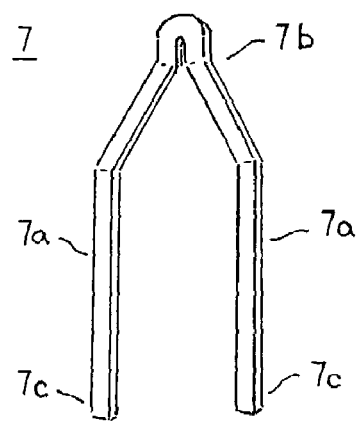
FIG. 8 is a perspective showing a conductor segment constituting a stator winding of a stator used in an automotive alternator according to Embodiment 3 of the present invention.
Figure 9:
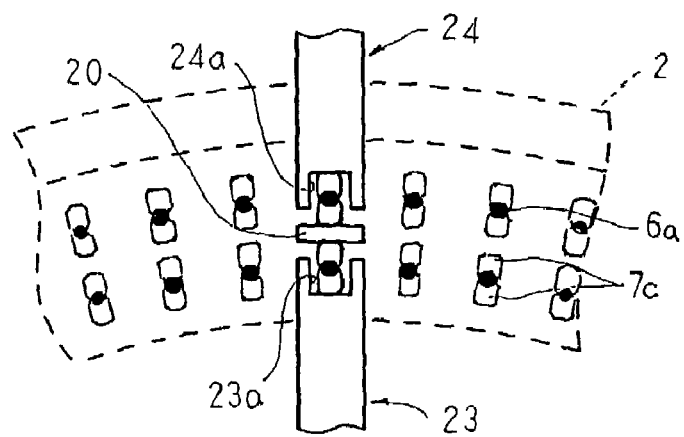
FIG. 9 is an end elevation explaining a dynamoelectric machine winding joining method according to Embodiment 3 of the present invention.
Figure 10:
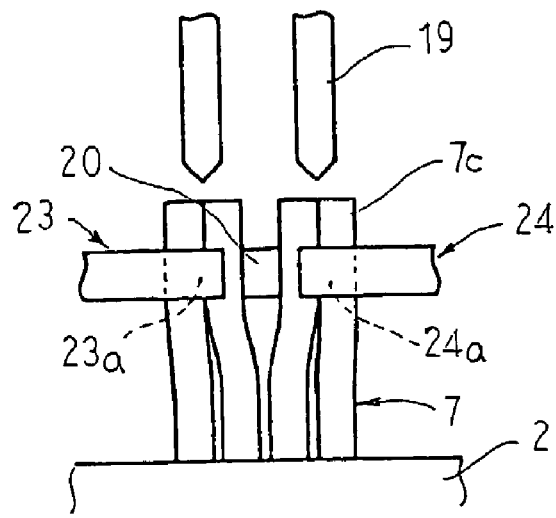
FIG. 10 is a side elevation explaining the dynamoelectric machine winding joining method according to Embodiment 3 of the present invention.

In Embodiment 3, as shown in FIG. 8, conductor segments (electrical conductors) 7 formed with a general U shape in which a pair of straight portions 7a are linked by a generally V-shaped return portion 7b by bending a copper wire having a rectangular cross section coated with an electrical insulator are used, and as shown in FIG. 9 and FIG. 10, first and second radial restraining members 23 and 24 made of a stainless steel in which first and second recess portions 23a and 24a for restraining free ends 7c (joint end portions) are formed on tip portions are used. Moreover, the rest of this embodiment is constructed in a similar manner to Embodiment 1 above.

In Embodiment 3, in a similar manner to Embodiment 1 above, the conductor segments 7 are inserted from the first end surface of the stator core 2 two by two into pairs of slots 2a three slots apart, and at the second end surface of the stator core 2, thirty-six rows of four free ends 7c are arranged into an annular shape at a pitch of one slot in a circumferential direction so as to line up in single rows in a radial direction.

Then, the intermediate holding member 20 is inserted between a second free end 7c and a third free end 7c of four free ends 7c arranged in a single row in a radial direction. In addition, the first radial restraining member 23 is pressed against the free end 7c at the innermost circumference from radially inside, and the second radial restraining member 24 is pressed against the free end 7c at the outermost circumference from radially outside.

Thus, as shown in FIGS. 9 and 10, first and second free ends 7c from the inner circumferential side in a radial direction are placed in close contact with each other, and third and fourth free ends 7c are also placed in close contact with each other. Furthermore, the second and third free ends 7c from the inner circumferential side in a radial direction are separated from each other by the intermediate holding member 20. In addition, the first and second radial restraining members 23 and 24 and the intermediate holding member 20 are placed in close contact with radially-adjacent free ends 7c. Still furthermore, the first and second free ends 7c from the inner circumferential side in a radial direction are housed inside the first recess portion 23a to regulate circumferential movement, and the third and fourth free ends 7c are housed inside the second recess portion 24a to regulate circumferential movement. Moreover, the recess portions 23a and 24a serve a function of restraining the radial and circumferential movement of the free ends 7c.

After the intermediate holding member 20 and the first and second radial restraining members 23 and 24 are set in this manner, a torch 19 is moved above the weld portions 6a, and TIG welding is performed to fuse together each of two pairs of radially-adjacent free ends 7c.

Then, the first and second radial restraining members 23 and 24 and the intermediate holding member 20 are similarly set on a circumferentially-adjacent row of free ends 7c. Then, the torch 19 is moved circumferentially by one slot, and each of two pairs of adjacent free ends 7c are fused together in a similar manner.

This operation is repeated, sequentially fusing together pairs of adjacent free ends 7c.

According to Embodiment 3, because the recess portions 23a and 24a for regulating the circumferential movement of the free ends 7c are provided on the tip portions of the first and second radial restraining members 23 and 24, in addition to the effects of Embodiment 1 above, the circumferential movement of the free ends 7c is regulated by first and second side walls of the recess portions 23a and 24a when the free ends 7c are restrained by the first and second radial restraining members 23 and 24 in a radial direction. Thus, contact between the radially-adjacent free ends 7c is stably ensured during joining, suppressing the occurrence of joint defects.

Furthermore, because the conductor segments 7 are formed with a rectangular cross section, the radially-adjacent free ends 7c come into surface contact with each other and the free ends 7c come into surface contact with the first and second radial restraining members 23 and 24 and the intermediate holding member 20. Thus, the contact surface area of each of the contacting portions is increased, improving joining and facilitating arc heat dissipation, thereby suppressing degradation of the electrically-insulating coating on the conductor segments 7.

Moreover, in Embodiment 3 above, the means for regulating the circumferential movement of the free ends 7c (the recess portions 23a and 24a) is disposed on the first and second radial restraining members 23 and 24, but the means for regulating the circumferential movement of the free ends 7c may also be disposed on the intermediate holding member 20. In that case, the means for regulating the circumferential movement of the free ends 7c is not limited to recess portions, and may also be a pair of guide pieces, for example, disposed so as to project from the members 20, 23, and 24 with a spacing equivalent to the circumferential width of the free ends 7c.

Embodiment 4

Figure 11:
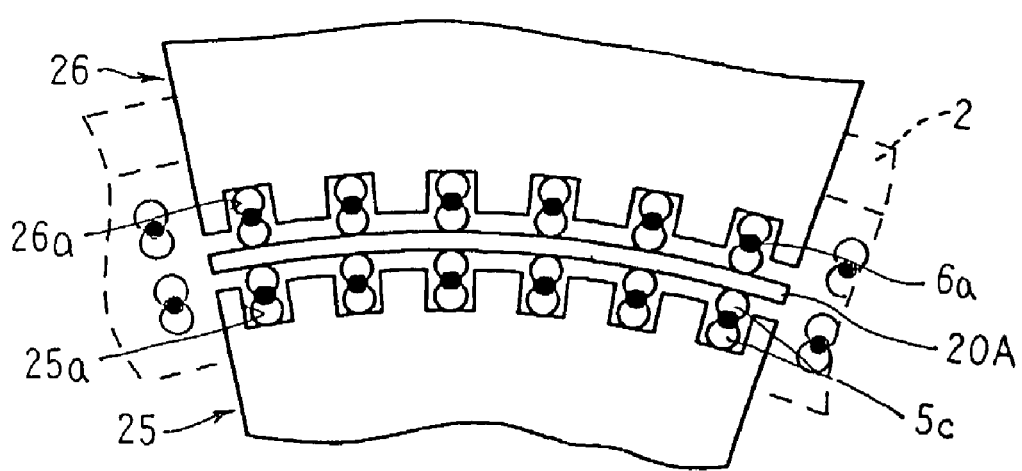
FIG. 11 is an end elevation explaining a dynamoelectric machine winding joining method according to Embodiment 4 of the present invention.

FIG. 11 is an end elevation explaining a dynamoelectric machine winding joining method according to Embodiment 4 of the present invention.

In FIG. 11, an intermediate holding member 20A is a flat plate made of a stainless steel prepared into an arc shape, and has a length spanning six rows of free ends 5c in a circumferential direction. A first radial restraining member 25 is made of a stainless steel, and six first recess portions 25a for restraining the free ends 5c are formed at a pitch of one slot in a tip portion of the first radial restraining member 25. A second radial restraining member 26 is made of a stainless steel, and six second recess portions 26a for restraining the free ends 5c are formed at a pitch of one slot in a tip portion of the second radial restraining member 26.

Moreover, except for the fact that the intermediate holding member 20A, the first radial restraining member 25, and the second radial restraining member 26 are used instead of the intermediate holding member 20, the first radial restraining member 21, and the second radial restraining member 22, this embodiment is constructed in a similar manner to Embodiment 1 above.

In Embodiment 4, as shown in FIG. 11, the intermediate holding member 20A is inserted between second free ends 5c and third free ends 5c from the inner circumferential side in a radial direction spanning six rows of free ends 5c in a circumferential direction, the first radial restraining member 25 is pressed against six free ends 5c at the innermost circumference from radially inside, and the second radial restraining member 26 is pressed against six free ends 5c at the outermost circumference from radially outside.

Thus, each of the pairs of first and second free ends 5c from the inner circumferential side in a radial direction are placed in close contact with each other, and each of the pairs of third and fourth free ends 5c are also placed in close contact with each other. Furthermore, the second and third free ends 5c from the inner circumferential side in a radial direction are each separated from each other by the intermediate holding member 20A. In addition, the first and second radial restraining members 25 and 26 and the intermediate holding member 20A are placed in close contact with radially-adjacent free ends 5c. Still furthermore, the first and second free ends 5c from the inner circumferential side in a radial direction are housed inside each of the first recess portions 25a to regulate circumferential movement, and the third and fourth free ends 5c are housed inside the second recess portions 26a to regulate circumferential movement. Moreover, the recess portions 25a and 26a serve a function of restraining the radial and circumferential movement of the free ends 5c.

After the intermediate holding member 20A and the first and second radial restraining members 25 and 26 are set in this manner, a torch 19 is moved above the weld portions 6a on the inner circumferential side. Then, a positive electrode of a welding power source (not shown) is connected to the intermediate holding member 20A and the first and second radial restraining members 25 and 26, a negative electrode of the welding power source is connected to the torch 19, and TIG welding is performed while supplying an inert gas to the torch 19 to fuse together the free ends 5c on the inner circumferential side. Next, the torch 19 is moved above the weld portions 6a on the outer circumferential side, and the free ends 5c on the outer circumferential side are fused together.

Next, the welding power source is switched off, and the torch 19 is moved above the weld portions 6a on the inner circumferential side of the next row in a circumferential direction. Then, the welding power source is switched on to fuse together the free ends 5c on the inner circumferential side. This operation is performed repeatedly to join together the six rows of radially-adjacent free ends 5c in a circumferential direction.

Then, the first and second radial restraining members 25 and 26 and the intermediate holding member 20A are similarly set relative to the next six rows of free ends 5c in a circumferential direction. Then, the torch 19 is moved circumferentially, and each of the radially-adjacent free ends 5c are fused together in a similar manner.

This operation is repeated, sequentially fusing together the free ends 5c being joined.

According to Embodiment 4, because the intermediate holding member 20A, the first radial restraining member 25, and the second radial restraining member 26 are constructed so as to be able to restrain six rows of free ends 5c in a circumferential direction simultaneously, in addition to the effects of Embodiment 1 above, when all of the pairs of free ends 5c arranged in an annual shape are being joined together, it is sufficient to set the members 20A, 25, and 26 only six times, improving joining workability.

Furthermore, because the recess portions 25a and 26a for regulating the circumferential movement of the free ends 5c are provided on the first and second radial restraining members 25 and 26, the circumferential movement of the free ends 5c is regulated by first and second side walls of the recess portions 25a and 26a when the free ends 5c are restrained by the first and second radial restraining members 25 and 26 in a radial direction. Thus, contact between the radially-adjacent free ends 5c is stably ensured during joining, suppressing the occurrence of joint defects. In addition, because the recess portions 25a and 26a are formed at an even pitch, circumferential clearance between the joint portions 6 is uniformly ensured, improving electrical insulation of the joint portions 6 in a circumferential direction.

Moreover, in Embodiment 4 above, the intermediate holding member 20A, the first radial restraining member 25, and the second radial restraining member 26 are manufactured to a length enabling six rows of free ends 5c to be simultaneously restrained in a circumferential direction, but the number of rows of free ends 5c simultaneously restrained by the intermediate holding member 20A, the first radial restraining member 25, and the second radial restraining member 26 is not limited to six rows. It is desirable that the number of rows of free ends 5c simultaneously restrained by the members 20A, 25, and 26 be L/m, where L is the total number of rows of free ends 5c and m is an integer. Here, it is desirable that m be equal to or greater than 3 because if m is 1 or 2, it is difficult for the first radial restraining member 25 and the second radial restraining member 26 to restrain the free ends 5c by pressing from radially inside and outside.

Furthermore, it goes without saying that the length of the intermediate holding member 20A and the length of the first radial restraining member 25 and the second radial restraining member 26 may be different.

Furthermore, the intermediate holding member 20A may also be prepared into an annular shape, joining being performed while setting only the first radial restraining member 25 and the second radial restraining member 26 at a predetermined pitch, for example, a pitch of six slots.

Embodiment 5

In Embodiment 4 above, the intermediate holding member 20A is made of a stainless steel and has a length spanning six rows of free ends 5c in a circumferential direction, but in Embodiment 5, an intermediate holding member is made of a nylon (a polyamide resin) in an annular shape.

Moreover, the rest of this embodiment is constructed in a similar manner to Embodiment 4 above.

In Embodiment 5, the intermediate holding member is interposed between the second free ends 5c and the third free ends 5c from the inner circumferential side around the entire circumference. Thus, the intermediate holding member only has to be set once, improving joining workability.

Furthermore, because the intermediate holding member is made of a nylon, it is not necessary to remove the intermediate holding member after joining together the free ends 5c, improving joining workability. In addition, when the intermediate holding member is interposed between the joint portions 6, electrical insulation between the joint portions 6 is reliably ensured.

Moreover, in Embodiment 5 above, an intermediate holding member made of a nylon is used, but for example, a polyimide resin or a glass fiber-reinforced epoxy resin can be used for the intermediate holding member provided that it is an electrically-insulating material.

Furthermore, in Embodiment 5 above, the intermediate holding member is manufactured into an annular shape, but the intermediate holding member does not necessarily have to be manufactured into an annular shape, and for example, may also be manufactured to a length spanning a plurality of rows of free ends 5c in a circumferential direction. In that case also, it is not necessary to detach the intermediate holding member, improving joining workability.

Embodiment 6

Figure 12:
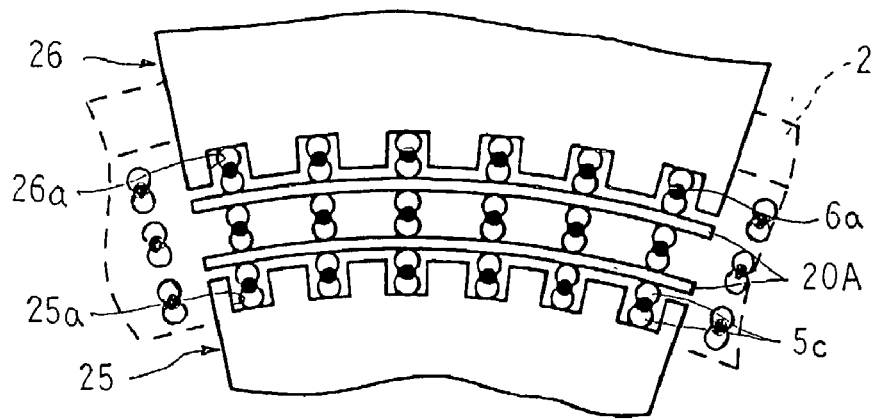
FIG. 12 is an end elevation explaining a dynamoelectric machine winding joining method according to Embodiment 6 of the present invention.

In Embodiment 4 above, thirty-six rows of four free ends 5c are arranged into an annular shape at a pitch of one slot in a circumferential direction so as to line up in single rows in a radial direction, radially-adjacent pairs of the free ends 5c being joined together, but in Embodiment 6, as shown in FIG. 12, thirty-six rows of six free ends 5c are arranged into an annular shape at a pitch of one slot in a circumferential direction so as to line up in single rows in a radial direction, radially-adjacent pairs of the free ends 5c being joined together. Moreover, the insertion points for the conductor segments 5 inside the slots 2*a* are called Address 1, Address 2, etc., through Address 6, respectively, from the inner circumferential side.

In Embodiment 6, in each of pairs of slots three slots apart, a first conductor segment 5 is inserted from the first end surface of the stator core 2 into Address 1 of the first slot 2*a* and Address 2 of the second slot 2*a*, a second conductor segment 5 is inserted from the first end surface of the stator core 2 into Address 3 of the first slot 2*a* and Address 4 of the second slot 2*a*, and a third conductor segment 5 is inserted from the first end surface of the stator core 2 into Address 5 of the first slot 2*a* and Address 6 of the second slot 2*a*. Then, the free end sections of all of the conductor segments 5 which are at an identical radial position are inclined in a like circumferential direction, and the free end sections of radially-adjacent conductor segments 5 are inclined in opposite circumferential directions. In addition, the free ends 5*c* of each of the conductor segments 5 are bent to face axially outward. Next, the free ends 5*c* of the conductor segments 5 projecting from Address 1 and Address 2 in each of the pairs of slots are stacked in a radial direction, the free ends 5*c* of the conductor segments 5 projecting from Address 3 and Address 4 in each of the pairs of slots are stacked in a radial direction, and the free ends 5*c* of the conductor segments 5 projecting from Address 5 and Address 6 in each of the pairs of slots are stacked in a radial direction. Thus, at the second end surface of the stator core 2, thirty-six rows of six free ends 5*c* are arranged into an annular shape at a pitch of one slot in a circumferential direction so as to line up in single rows in a radial direction.

Then, a first intermediate holding member 20A is inserted between a second free end 5*c* and a third free end 5*c* of each of the six free ends 5*c* arranged in single rows in a radial direction, and a second intermediate holding member 20A is inserted between a fourth free end 5*c* and a fifth free end 5*c* of each of the six free ends 5*c* arranged in a single rows in a radial direction. In addition, a first radial restraining member 25 is pressed against the free ends 5*c* at the innermost circumference from radially inside, and a second radial restraining member 21 is pressed against the free ends 5*c* at the outermost circumference from radially outside.

Thus, as shown in FIG. 12, first and second free ends 5*c* from the inner circumferential side in a radial direction are placed in close contact with each other, third and fourth free ends 5*c* are also placed in close contact with each other,, and fifth and sixth free ends 5*c* are also placed in close contact with each other. Furthermore, the second and third free ends 5*c* from the inner circumferential side in a radial direction are separated from each other by the first intermediate holding member 20A, and the fourth and fifth free ends 5*c* are separated from each other by the second intermediate holding member 20A. In addition, the first and second radial restraining members 25 and 26 and the intermediate holding members 20A are placed in close contact with radially-adjacent free ends 5*c*.

Next, a torch 19 connected to a negative electrode of a welding power source (not shown) is moved above a pair of adjacent free ends 5*c* on the inner circumferential side. The first and second radial restraining members 25 and 26 and the intermediate holding members 20A are connected to a positive electrode of the welding power source. Then, when the welding power source is switched on, an inert gas is supplied to the torch 19, and an arc is discharged between the torch 19 and a weld portion 6*a* (the pair of adjacent free ends 5*c*). The adjacent free ends 5*c* on the inner circumferential side are fused together by the heat of the arc.

Next, the torch 19 is moved above the pair of adjacent free ends 5*c* in the center and the adjacent free ends 5*c* in the center are fused together, and then the torch 19 is moved above the pair of adjacent free ends 5*c* on the outer circumferential side and the adjacent free ends 5*c* on the outer circumferential side are fused together.

Next, the welding power source is switched off, and the torch 19 is moved above the weld portions 6*a* on the inner circumferential side of the next row. Then, the welding power source is switched on to fuse together the free ends 5*c* on the inner circumferential side, at the center, and on the outer circumferential side sequentially. This operation is performed repeatedly to fuse together each of the pairs in the six rows of radially-adjacent free ends 5*c* in a circumferential direction.

Next, the first and second radial restraining members 25 and 26 and the intermediate holding members 20A are similarly set relative to the next six rows of free ends 5*c* in a circumferential direction. Then, the torch 19 is moved circumferentially, and each of the pairs of adjacent free ends 5*c* are fused together in a similar manner.

This operation is repeated, sequentially fusing together each of the pairs of free ends 5*c* being joined.

Consequently, similar effects to those in Embodiment 4 above can also be achieved in Embodiment 6.

Embodiment 7

Figure 13:
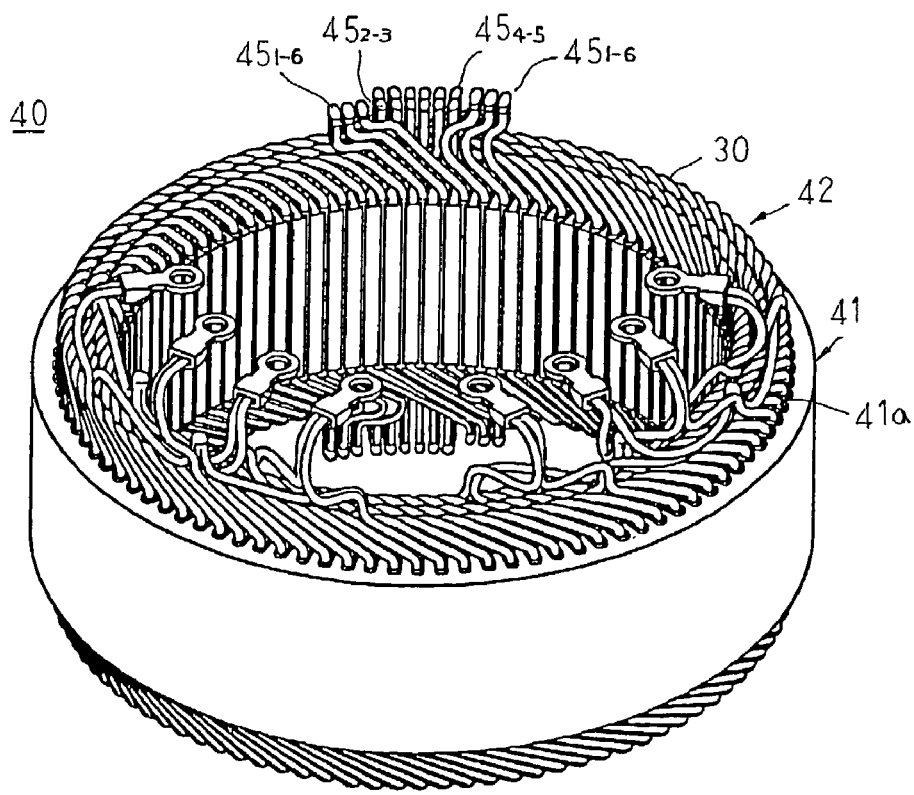
FIG. 13 is a perspective from a second end of a stator for an automotive alternator manufactured by a dynamoelectric machine winding joining method according to Embodiment 7 of the present invention.
Figure 14:
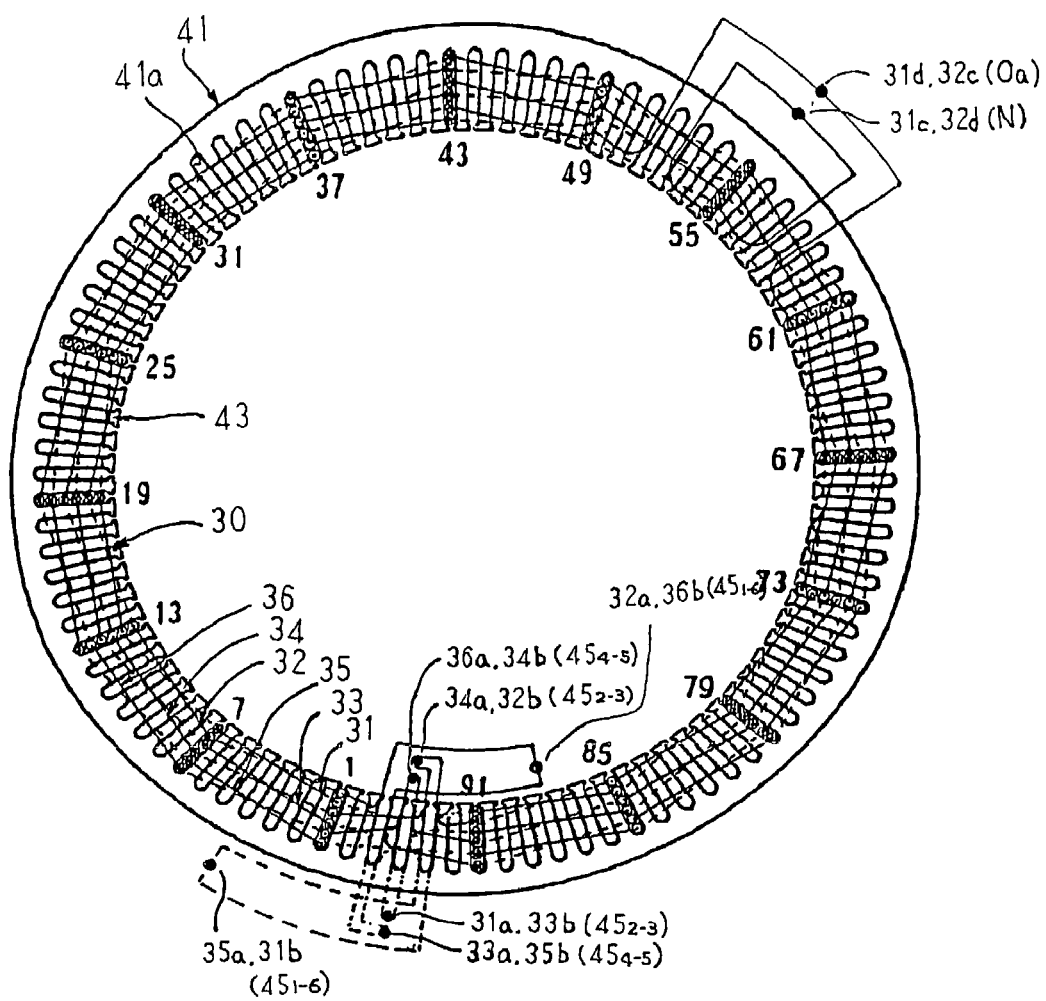
FIG. 14 is an end elevation explaining connections in a first stator winding phase portion of the stator for an automotive alternator shown in FIG. 13.
Figure 15:
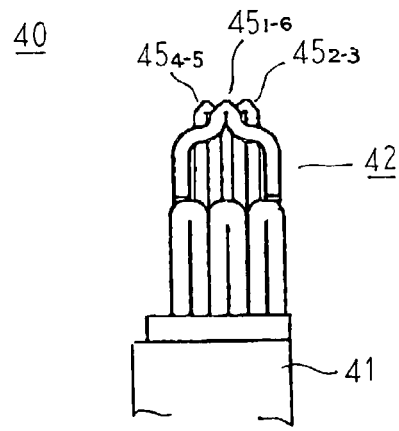
FIG. 15 is a view from a circumferential direction of a vicinity of stator winding joint portions of the stator for an automotive alternator shown in FIG. 13.
Figure 16:
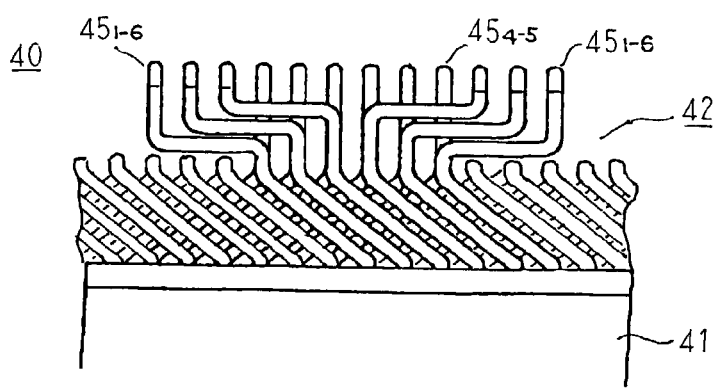
FIG. 16 is a side elevation from radially outside the vicinity of the stator winding joint portions of the stator for an automotive alternator shown in FIG. 13.
Figure 17:
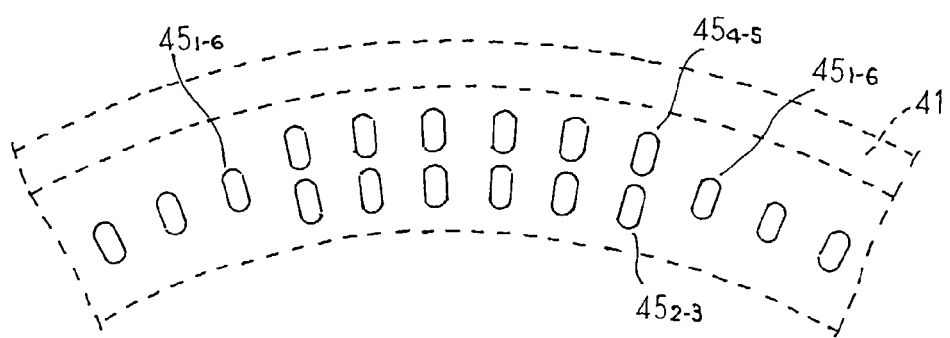
FIG. 17 is an end elevation schematically showing the vicinity of the stator winding joint portions of the stator used in the automotive alternator shown in FIG. 13.
Figure 18:
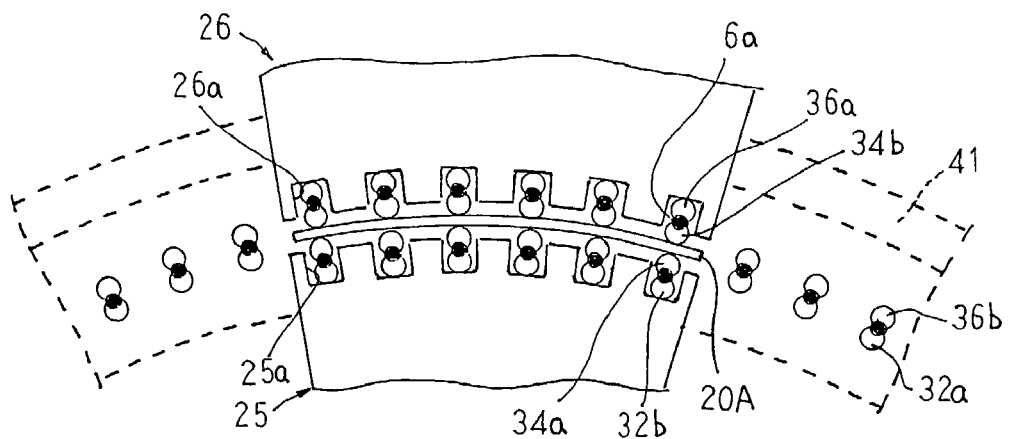
FIG. 18 is an end elevation explaining the dynamoelectric machine winding joining method according to Embodiment 7 of the present invention.
Figure 19:
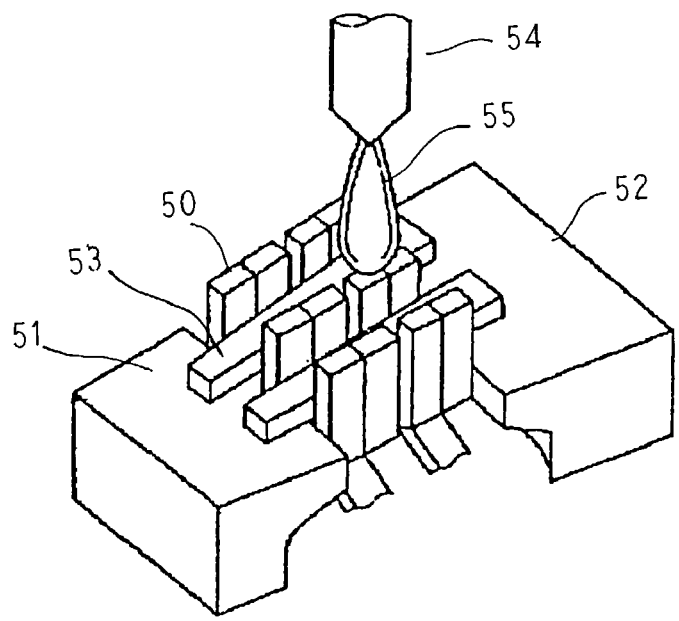
FIG. 19 is a perspective explaining a conventional dynamoelectric machine winding joining method.

FIG. 13 is a perspective from a second end of a stator for an automotive alternator manufactured by a dynamoelectric machine winding joining method according to Embodiment 7 of the present invention, FIG. 14 is an end elevation explaining connections in a first stator winding phase portion of the stator for an automotive alternator shown in FIG. 13, FIG. 15 is a view from a circumferential direction of a vicinity of stator winding joint portions of the stator for an automotive alternator shown in FIG. 13, FIG. 16 is a side elevation from radially outside the vicinity of the stator winding joint portions of the stator for an automotive alternator shown in FIG. 13, FIG. 17 is an end elevation schematically showing the vicinity of the stator winding joint portions of the stator used in the automotive alternator shown in FIG. 13, and FIG. 18 is an end elevation explaining the dynamoelectric machine winding joining method according to Embodiment 7 of the present invention.

Moreover, in FIG. 14, 1 through 96 represent slot numbers, broken lines indicate windings at a first end of the stator core, solid lines indicate windings at a second end of the stator core, and black dots indicate joint portions.

In FIG. 13, a stator 40 includes: a cylindrical stator core 41 in which a plurality of slots 41*a* extending in an axial direction are formed at a predetermined pitch in a circumferential direction; and a stator winding 42 installed in the stator core 41. Here, there are ninety-six slots 41*a*, in other words, the slots 41*a* are formed at a ratio of two per phase per pole.

The stator winding 42 is constituted by a plurality of winding sub-portions in each of which one continuous conductor wire 30 (an electrical conductor) made of a copper wire coated with an electrical insulator is installed in every sixth slot of the slots 41*a* so as to alternately occupy an inner layer and an outer layer in a radial direction.

The construction of an a-phase winding phase portion 43 constituting the stator winding 42 will now be explained in detail with reference to FIG. 14.

The a-phase winding phase portion 43 is constituted by first to sixth winding sub-portions 31 to 36 in each of which one continuous conductor wire 30 made of a copper wire having a circular cross section coated with an electrical insulator is installed in every sixth slot of the slots 41*a*.

The first winding sub-portion 31 is constructed by wave winding a continuous conductor wire 30 into every sixth slot from Slot Numbers 1 to 91 so as to alternately occupy Address 2 and Address 1 in the slots 41*a*. The second winding sub-portion 32 is constructed by wave winding a continuous conductor wire 30 into every sixth slot from Slot Numbers 1 to 91 so as to alternately occupy Address 1 and Address 2 in the slots 41*a*. The third winding sub-portion 33 is constructed by wave winding a continuous conductor wire 30 into every sixth slot from Slot Numbers 1 to 91 so as to alternately occupy Address 4 and Address 3 in the slots 41*a*. The fourth winding sub-portion 34 is constructed by wave winding a continuous conductor wire 30 into every sixth slot from Slot Numbers 1 to 91 so as to alternately occupy Address 3 and Address 4 in the slots 41*a*. The fifth winding sub-portion 35 is constructed by wave winding a continuous conductor wire 30 into every sixth slot from Slot Numbers 1 to 91 so as to alternately occupy Address 6 and Address 5 in the slots 41*a*. The sixth winding sub-portion 36 is constructed by wave winding a continuous conductor wire 30 into every sixth slot from Slot Numbers 1 to 91 so as to alternately occupy Address 5 and Address 6 in the slots 41*a*.

At a first end of the stator core 41, a first end portion 31*a* (a joint end portion) of the first winding sub-portion 31 projecting from Address 2 of Slot Number 1 and a second end portion 33*b* (a joint end portion) of the third winding sub-portion 33 projecting from Address 3 of Slot Number 91 are stacked radially and joined, a first end portion 33*a* (a joint end portion) of the third winding sub-portion 33 projecting from Address 4 of Slot Number 1 and a second end portion 35*b* (a joint end portion) of the fifth winding sub-portion 35 projecting from Address 5 of Slot Number 91 are stacked radially and joined, and a first end portion 35*a* (a joint end portion) of the fifth winding sub-portion 35 projecting from Address 6 of Slot Number 1 and a second end portion 31*b* (a joint end portion) of the first winding sub-portion 31 projecting from Address 1 of Slot Number 91 are stacked radially and joined to construct a three-turn wave winding in which the first, third, and fifth winding sub-portions 31, 33, and 35 are connected in series.

At a second end of the stator core 41, a first end portion 32*a* (a joint end portion) of the second winding sub-portion 32 projecting from Address 1 of Slot Number 1 and a second end portion 36*b* (a joint end portion) of the sixth winding sub-portion 36 projecting from Address 6 of Slot Number 91 are stacked radially and joined, a first end portion 34*a* (a joint end portion) of the fourth winding sub-portion 34 projecting from Address 3 of Slot Number 1 and a second end portion 32*b* (a joint end portion) of the second winding sub-portion 32 projecting from Address 2 of Slot Number 91 are stacked radially and joined, and a first end portion 36*a* (a joint end portion) of the sixth winding sub-portion 36 projecting from Address 5 of Slot Number 1 and a second end portion 34*b* (a joint end portion) of the fourth winding sub-portion 34 projecting from Address 4 of Slot Number 91 are stacked radially and joined to construct a three-turn wave winding in which the second, fourth, and sixth winding sub-portions 32, 34, and 36 are connected in series.

A portion of the first winding sub-portion 31 projecting at the second end of the stator core 41 from Slot Numbers 49 and 55 is cut, and a portion of the second winding sub-portion 32 projecting at the second end of the stator core 41 from Slot Numbers 55 and 61 is cut. Then, the wave winding in which the first, third, and fifth winding sub-portions 31, 33, and 35 are connected in series and the wave winding in which the second, fourth, and sixth winding sub-portions 32, 34, and 36 are connected in series are connected in parallel by joining together a first cut end 31*c* of the first winding sub-portion 31 and a second cut end 32*d* of the second winding sub-portion 32 and joining together a second cut end 31*d* of the first winding sub-portion 31 and a first cut end 32*c* of the second winding sub-portion 32, constituting the three-turn a-phase winding phase portion 43. Moreover, the joint portion between the first cut end 31*c* of the first winding sub-portion 31 and the second cut end 32*d* of the second winding sub-portion 32 becomes a neutral point (N), and the joint portion between the second cut end 31*d* of the first winding sub-portion 31 and the first cut end 32*c* of the second winding sub-portion 32 becomes an output wire (Oa).

Although not shown, a d-phase winding phase portion is constructed by similarly installing and joining together six continuous conductor wires 30 in a slot group including Slot Numbers 2, 8, etc., through 92. A b-phase winding phase portion is constructed by similarly installing and joining together six continuous conductor wires 30 in a slot group including Slot Numbers 3, 9, etc., through 93. A e-phase winding phase portion is constructed by similarly installing and joining together six continuous conductor wires 30 in a slot group including Slot Numbers 4, 10, etc., through 94. A c-phase winding phase portion is constructed by similarly installing and joining together six continuous conductor wires 30 in a slot group including Slot Numbers 5, 11, etc., through 95. A f-phase winding phase portion is constructed by similarly installing and joining together six continuous conductor wires 30 in a slot group including Slot Numbers 6, 12, etc., through 96.

Then, a first three-phase alternating-current winding is constructed by connecting each of the neutral points (N) of the a-phase winding phase portion, the b-phase winding phase portion, and the c-phase winding phase portion, and a second three-phase alternating-current winding is constructed by connecting each of the neutral points (N) of the d-phase winding phase portion, the e-phase winding phase portion, and the f-phase winding phase portion. The stator winding 42 is constituted by the first and second three-phase alternating current windings constructed in this manner.

As shown in FIGS. 15 to 17, at the first and second ends of the stator core 41, six rows of joint portions including a first joint portion $45_{2\text{-}3}$ joining the end portions of the continuous conductor wires 30 projecting from Address 2 and Address 3 of each of the winding phase portions and a second joint portion $45_{4\text{-}5}$ joining the end portions of the continuous conductor wires 30 projecting from Address 4 and Address 5 of each of the winding phase portions are arranged at a pitch of one slot in a circumferential direction and line up in single rows in a radial direction so as to be at the same axial height. In addition, six third joint portions $45_{1\text{-}6}$ joining end portions of the continuous conductor wires 30 projecting from Address 1 and Address 6 of each of the winding phase portions are arranged in first and second groups of three at a pitch of one slot in a circumferential direction so as to be at the same axial height such that the first and second groups of three are disposed at first and second circumferential ends of the six rows of first and second joint portions $45_{2\text{-}3}$ and $45_{4\text{-}5}$, respectively.

Next, a joining method for the six rows of first and second joint portions $45_{2\text{-}3}$ and $45_{4\text{-}5}$ at the first and second ends of the stator core 41 will be explained with reference to FIG. 18.

At the second end surface of the stator core 41, six rows of the second end portion 32*b* of the second winding sub-portion 32, the first end portion 34a of the fourth winding sub-portion 34, the second end portion 34b of the fourth winding sub-portion 34, and the first end portion 36a of the sixth winding sub-portion 36 of each of the winding phase portions are arranged at a pitch of one slot in a circumferential direction so as to line up in single rows in a radial direction. Then, an intermediate holding member 20A is inserted between the six rows of first and second end portions 34a and 34b of the fourth winding sub-portions 34, a first radial restraining member 25 is pressed against the six rows of second end portions 32b of the second winding sub-portions 32 from radially inside, and a second radial restraining member 21 is pressed against the six rows of first end portions 36a of the sixth winding sub-portions 36 from radially outside.

Thus, each of the pairs of second end portions 32b of the second winding sub-portions 32 and first end portions 34a of the fourth winding sub-portions 34 are placed in close contact with each other, and each of the pairs of second end portions 34b of the fourth winding sub-portions 34 and first end portions 36a of the sixth winding sub-portions 36 are also placed in close contact with each other. Furthermore, the first end portions 34a of the fourth winding sub-portions 34 and the second end portions 34b of the fourth winding sub-portions 34 are each separated from each other by the intermediate holding member 20A. In addition, the first and second radial restraining members 25 and 26 and the intermediate holding member 20A are placed in close contact with radially-adjacent end portions 32b, 34a, 34b, and 36a. Still furthermore, the second end portions 32b of the second winding sub-portions 32 and first end portions 34a of the fourth winding sub-portions 34 are housed inside each of first recess portions 25a to regulate circumferential movement, and the second end portions 34b of the fourth winding sub-portions 34 and first end portions 36a of the sixth winding sub-portions 36 are housed inside second recess portions 26a to regulate circumferential movement.

After the intermediate holding member 20A and the first and second radial restraining members 25 and 26 are set in this manner, a torch 19 is moved above the weld portions 6a on the inner circumferential side. Then, a positive electrode of a welding power source (not shown) is connected to the intermediate holding member 20A and the first and second radial restraining members 25 and 26, a negative electrode of the welding power source is connected to the torch 19, and TIG welding is performed while supplying an inert gas to the torch 19 to fuse together the second end portions 32b of the second winding sub-portions 32 and first end portions 34a of the fourth winding sub-portions 34 on the inner circumferential side. Next, the torch 19 is moved above the weld portions 6a on the outer circumferential side, and the second end portions 34b of the fourth winding sub-portions 34 and first end portions 36a of the sixth winding sub-portions 36 on the outer circumferential side are fused together.

Next, the welding power source is switched off, and the torch 19 is moved above the weld portions 6a on the inner circumferential side of the next row in a circumferential direction. Then, the welding power source is switched on to fuse together the second end portions 32b of the second winding sub-portions 32 and first end portions 34a of the fourth winding sub-portions 34 on the inner circumferential side. This operation is performed repeatedly to join together the six circumferential rows of radially-adjacent second end portions 32b of the second winding sub-portions 32 and first end portions 34a of the fourth winding sub-portions 34 and radially-adjacent second end portions 34b of the fourth winding sub-portions 34 and first end portions 36a of the sixth winding sub-portions 36.

Furthermore, at the first end surface of the stator core 41, the six circumferential rows of radially-adjacent first end portions 31a of the first winding sub-portions 31 and second end portions 33b of the third winding sub-portions 33 and radially-adjacent first end portions 33a of the third winding sub-portions 33 and second end portions 36a of the fifth winding sub-portions 36 are also joined together in a similar manner.

At the first and second ends of the stator core 41, radially-adjacent second end portions 31b of the first winding sub-portions 31 and first end portions 35a of the fifth winding sub-portions 35 and radially-adjacent first end portions 32a of the second winding sub-portions 32 and second end portions 36b of the sixth winding sub-portions 36 are also TIG welded by pressing from radially inside and outside by means of a pair of radial restraining members.

Consequently, similar effects to those in Embodiment 4 above can also be achieved in Embodiment 7.

The present invention is constructed in the above manner and exhibits the effects described below.

According to one aspect of the present invention, there is provided a dynamoelectric machine winding joining method for joining together radially-adjacent electrical conductor joint end portions two by two at an axial end portion of a cylindrical core, 2n of the electrical conductor joint end portions being arranged in a single row in a radial direction, where n is an integer equal to or greater than 2, the dynamoelectric machine winding joining method including;

a joint end portion restraining process in which an intermediate holding member is interposed between pairs of the joint end portions being joined, a first radial restraining member is pressed against the joint end portion positioned at an innermost circumference from radially inside, and a second radial restraining member is pressed against the joint end portion positioned at an outermost circumference from radially outside to place the joint end portions being joined, the intermediate holding member and the joint end portions radially-adjacent to the intermediate holding member, the first radial restraining member and the joint end portion positioned at the innermost circumference, and the second radial restraining member and the joint end portion positioned at the outermost circumference in close contact; and a joining process for joining together the joint end portions being joined, the joining process being subsequent to the joint end portion restraining process, thereby providing a dynamoelectric machine winding joining method enabling a winding to be joined simply and with a high yield by suppressing degradation of an electrically-insulating coating on the conductors and ensuring clearance between the joint portions.

At least one of the first radial restraining member, the second radial restraining member, and the intermediate holding member may serve a circumferential holding function for regulating circumferential movement of the joint end portions, making restraint of the joint end portions reliable, thereby enabling stable joining.

A plurality of rows of the joint end portions arranged in a single row in a radial direction may be arranged at a predetermined pitch in a circumferential direction, and the intermediate holding member may be disposed so as to span at least two circumferentially-adjacent rows of the joint end portions, reducing the number of times the intermediate holding member is set, thereby improving joining workability.

A plurality of rows of the joint end portions arranged in a single row in a radial direction may be arranged into an annular shape at a predetermined pitch in a circumferential direction, and the intermediate holding member may be formed into an annular shape and be interposed between pairs of the joint end portions being joined which are at identical radial positions, whereby the intermediate holding member only has to be set once, thereby improving joining workability.

The first and second radial restraining members may each be constructed so as to be able to press against at least two circumferentially-adjacent joint end portions, reducing the number of times the first and second radial restraining members are set, thereby improving joining workability.

The first radial restraining member, the second radial restraining member, and the intermediate holding member may be made of a metal material, efficiently dissipating heat during joining by means of each of the members, thereby suppressing degradation of the electrically-insulating coating on the electrical conductors.

The first radial restraining member and the second radial restraining member may be made of a metal material, and the intermediate holding member may be made of an electrically-insulating material, eliminating the need to remove the intermediate holding member after joining, thereby improving joining workability and also preventing incidents of short-circuiting between the joint portions.

The radially-adjacent joint end portions may be arc welded, reducing expansion of the joint portions, thereby suppressing incidents of short-circuiting among the joint portions.

The joint end portions may be placed in surface contact with at least one of the first radial restraining member, the second radial restraining member, and the intermediate holding member, efficiently dissipating heat during joining by means of each of the members, thereby suppressing degradation of the electrically-insulating coating on the electrical conductors.

What is claimed is:

1. A dynamoelectric machine winding joining method for joining together radially-adjacent electrical conductor joint end portions two by two at an axial end portion of a cylindrical core, 2n of said electrical conductor joint end portions being arranged in a single row in a radial direction, where n is an integer equal to or greater than 2,
said dynamoelectric machine winding joining method comprising:
a joint end portion restraining process wherein: an intermediate holding member is interposed between pairs of said joint end portions being joined; a first radial restraining member is pressed against an innermost one of said joint end portions positioned at an innermost circumference from radially inside; a second radial restraining member is pressed against an outermost one of said joint end portions positioned at an outermost circumference from radially outside; and the interposing of the intermediate holding member and the pressing of the first and second radial restraining member place said joint end portions being joined, said intermediate holding member and said joint end portions radially-adjacent to said intermediate holding member, said first radial restraining member and said joint end portion positioned at said innermost circumference, and said second radial restraining member and said joint end portion positioned at said outermost circumference in close contact;
a bending process wherein the first and second radial restraining members press the joint end portions being joined against the intermediate holding member, and the joint end portions radially-adjacent to the intermediate holding member are bent about the intermediate holding member; and
a joining process for joining together said joint end portions being joined, said joining process being subsequent to said joint end portion restraining process, wherein:
a plurality of said single rows of said joint end portions arranged in a radial direction are arranged at a predetermined pitch in a circumferential direction; and
said intermediate holding member is disposed so as to span at least two circumferentially-adjacent rows of said joint end portions.

2. The dynamoelectric machine winding joining method according to claim 1, wherein at least one of said first radial restraining member, said second radial restraining member, and said intermediate holding member performs a circumferential holding function for regulating circumferential movement of said joint end portions.

3. The dynamoelectric machine winding joining method according to claim 1, wherein said first and second radial restraining members are each constructed so as to be able to press against at least two circumferentially-adjacent joint end portions.

4. The dynamoelectric machine winding joining method according to claim 1, wherein:
a plurality of said single rows of said joint end portions arranged in a radial direction are arranged into an annular shape at a predetermined pitch in a circumferential direction; and
said intermediate holding member is formed into an annular shape and is interposed between pairs of said joint end portions being joined which are at identical radial positions.

5. The dynamoelectric machine winding joining method according to claim 4, wherein said first and second radial restraining members are each constructed so as to be able to press against at least two circumferentially-adjacent joint end portions.

6. The dynamoelectric machine winding joining method according to claim 1, wherein said first radial restraining member, said second radial restraining member, and said intermediate holding member are made of a metal material.

7. The dynamoelectric machine winding joining method according to claim 6, wherein said joint end portions being joined are arc welded.

8. The dynamoelectric machine winding joining method according to claim 1, wherein said first radial restraining member and said second radial restraining member are made of a metal material, and said intermediate holding member is made of an electrically-insulating material.

9. The dynamoelectric machine winding joining method according to claim 8, wherein said joint end portions being joined are arc welded.

10. The dynamoelectric machine winding joining method according to claim 1, wherein said joint end portions are placed in surface contact with at least one of said first radial restraining member, said second radial restraining member, and said intermediate holding member.

11. A dynamoelectric machine winding joining method for joining together radially-adjacent electrical conductor joint end portions two by two at an axial end portion of a cylindrical core, 2n of said electrical conductor joint end portions being arranged in a single row in a radial direction, where n is an integer equal to or greater than 2, said dynamoelectric machine winding joining method including:

a joint end portion restraining process wherein: an intermediate holding member is interposed between pairs of said joint end portions being joined; a first radial restraining member is pressed against an innermost one of said joint end portions positioned at an innermost circumference from radially inside; a second radial restraining member is pressed against an outermost one of said joint end portions positioned at an outermost circumference from radially outside; and the interposing of the intermediate holding member and the pressing of the first and second radial restraining member place said joint end portions being joined, said intermediate holding member and said joint end portions radially-adjacent to said intermediate holding member, said first radial restraining member and said joint end portion positioned at said innermost circumference, and said second radial restraining member and said joint end portion positioned at said outermost circumference in close contact; and a joining process for joining together said joint end portions being joined, said joining process being subsequent to said joint end portion restraining process, wherein a plurality of said single rows of said joint end portions arranged in a radial direction are arranged at a predetermined pitch in a circumferential direction, and said intermediate holding member is disposed so as to span at least two circumferentially-adjacent rows of said joint end portions.

12. The dynamoelectric machine winding joining method according to claim 11, wherein said first and second radial restraining members are each constructed so as to be able to press against at least two circumferentially-adjacent joint end portions.

13. A dynamoelectric machine winding joining method for joining together radially-adjacent electrical conductor joint end portions two by two at an axial end portion of a cylindrical core, 2n of said electrical conductor joint end portions being arranged in a single row in a radial direction, where n is an integer equal to or greater than 2, said dynamoelectric machine winding joining method including:

a joint end portion restraining process wherein: an intermediate holding member is interposed between pairs of said joint end portions being joined; a first radial restraining member is pressed against an innermost one of said joint end portions positioned at an innermost circumference from radially inside; a second radial restraining member is pressed against an outermost one of said joint end portions positioned at an outermost circumference from radially outside; and the interposing of the intermediate holding member and the pressing of the first and second radial restraining member place said joint end portions being joined, said intermediate holding member and said joint end portions radially-adjacent to said intermediate holding member, said first radial restraining member and said joint end portion positioned at said innermost circumference, and said second radial restraining member and said joint end portion positioned at said outermost circumference in close contact; and a joining process for joining together said joint end portions being joined, said joining process being subsequent to said joint end portion restraining process, wherein a plurality of said single rows of said joint end portions arranged in a radial direction are arranged into an annular shape at a predetermined pitch in a circumferential direction, and said intermediate holding member is formed into an annular shape and is interposed between pairs of said joint end portions being joined which are at identical radial positions.

14. The dynamoelectric machine winding joining method according to claim 13, wherein said first and second radial restraining members are each constructed so as to be able to press against at least two circumferentially-adjacent joint end portions.

15. A dynamoelectric machine winding joining method for joining together radially-adjacent electrical conductor joint end portions two by two at an axial end portion of a cylindrical core, 2n of said electrical conductor joint end portions being arranged in a single row in a radial direction, where n is an integer equal to or greater than 2, said dynamoelectric machine winding joining method including:

a joint end portion restraining process wherein: an intermediate holding member is interposed between pairs of said joint end portions being joined; a first radial restraining member is pressed against an innermost one of said joint end portions positioned at an innermost circumference from radially inside; a second radial restraining member is pressed against an outermost one of said joint end portions positioned at an outermost circumference from radially outside; and the interposing of the intermediate holding member and the pressing of the first and second radial restraining member place said joint end portions being joined, said intermediate holding member and said joint end portions radially-adjacent to said intermediate holding member, said first radial restraining member and said joint end portion positioned at said innermost circumference, and said second radial restraining member and said joint end portion positioned at said outermost circumference in close contact; and a joining process for joining together said joint end portions being joined, said joining process being subsequent to said joint end portion restraining process, wherein said first radial restraining member and said second radial restraining member are made of a metal material, and said intermediate holding member is made of an electrically-insulating material.

16. The dynamoelectric machine winding joining method according to claim 15, wherein said joint end portions being joined are arc welded.

* * * * *